US011651268B2

(12) United States Patent
Takimoto (10) Patent No.: US 11,651,268 B2
(45) Date of Patent: May 16, 2023

(54) MODEL UPDATE SUPPORT SYSTEM

(71) Applicant: Kabushiki Kaisha Toshiba, Tokyo (JP)

(72) Inventor: Takahiro Takimoto, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1054 days.

(21) Appl. No.: 16/287,873

(22) Filed: Feb. 27, 2019

(65) Prior Publication Data

US 2020/0089949 A1 Mar. 19, 2020

(30) Foreign Application Priority Data

Sep. 13, 2018 (JP) .............................. JP2018-171824

(51) Int. Cl.
*G06K 9/00* (2022.01)
*G06K 9/62* (2022.01)
*G06N 20/00* (2019.01)
*G06N 5/04* (2006.01)

(52) U.S. Cl.
CPC ..... *G06K 9/00536* (2013.01); *G06K 9/00523* (2013.01); *G06K 9/6269* (2013.01); *G06N 5/04* (2013.01); *G06N 20/00* (2019.01)

(58) Field of Classification Search
CPC ........... G06K 9/00536; G06K 9/00523; G06K 9/6269; G06K 9/6263; G06K 9/6281; G06K 9/6277; G06K 5/04; G06N 20/00; G06V 40/10
See application file for complete search history.

(56) References Cited

U.S. PATENT DOCUMENTS

| 10,916,333 | B1 * | 2/2021 | Yeturu | G06N 5/003 |
| 2007/0043722 | A1 * | 2/2007 | MacNamee | G06K 9/6253 |
| 2019/0294923 | A1 * | 9/2019 | Riley | G06K 9/6271 |
| 2021/0201471 | A1 * | 7/2021 | Sreeram | G06K 9/00 |
| 2022/0165352 | A1 * | 5/2022 | Morselli Gysi | G16B 45/00 |

FOREIGN PATENT DOCUMENTS

JP 2003-132332 5/2003

* cited by examiner

*Primary Examiner* — John B Strege
(74) *Attorney, Agent, or Firm* — Knobbe, Martens, Olson & Bear, LLP (57) ABSTRACT

According to one embodiment, a model update support system supports an update of a first model trained using a training data group. The training data group includes a plurality of labeled data and includes a plurality of labels respectively labeling the plurality of labeled data. The system includes a processor. The processor is configured to output first information or second information based on a classification certainty and a plurality of similarities. The classification certainty is calculated using the first model and indicates a sureness of a classification of first data. The plurality of similarities respectively indicates likenesses between the first data and the plurality of labeled data. The first information indicates that the training of the first model is insufficient. The second information indicates that one of the plurality of labels is inappropriate.

11 Claims, 6 Drawing Sheets

MODEL UPDATE SUPPORT SYSTEM

CROSS-REFERENCE TO RELATED APPLICATIONS

This application is based upon and claims the benefit of priority from Japanese Patent Application No. 2018-171824, filed on Sep. 13, 2018; the entire contents of which are incorporated herein by reference.

FIELD

Embodiments described herein relate generally to a model update support system.

BACKGROUND

A model that is trained using deep learning is used to classify data, etc. It is desirable to appropriately update the model to continuously classify data with high accuracy.

DETAILED DESCRIPTION

According to one embodiment, a model update support system supports an update of a first model trained using a training data group. The training data group includes a plurality of labeled data and includes a plurality of labels respectively labeling the plurality of labeled data. The system includes a processor. The processor is configured to output first information or second information based on a classification certainty and a plurality of similarities. The classification certainty is calculated using the first model and indicates a sureness of a classification of first data. The plurality of similarities respectively indicate likenesses between the first data and the plurality of labeled data. The first information indicates that the training of the first model is insufficient. The second information indicates that one of the plurality of labels is inappropriate.

Embodiments of the invention will now be described with reference to the drawings.

In the drawings and the specification of the application, components similar to those described thereinabove are marked with like reference numerals, and a detailed description is omitted as appropriate.

Figure 1:
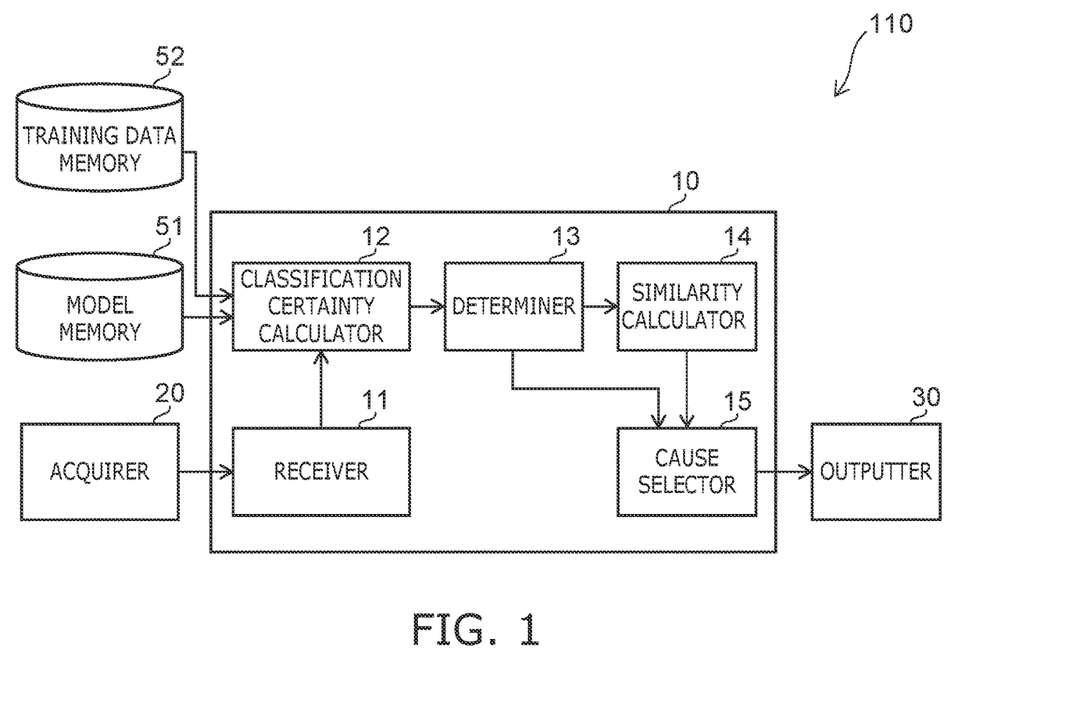
FIG. 1 is a schematic view illustrating a configuration of a model update support system according to a first embodiment.

FIG. 1 is a schematic view illustrating a configuration of a model update support system according to a first embodiment.

The model update support system 110 according to the first embodiment illustrated in FIG. 1 is used to support an update of a trained model.

For example, data may be classified using a trained model. If the model is trained sufficiently and appropriately for each of the classifications, the model can infer the classifications of the input data more accurately.

However, there are cases where the model is trained insufficiently or the model is trained inappropriately for one classification. In such a case, data that should be inferred as being in one classification may be inferred as being in another classification. Or, the data may be inferred as being in a classification with a low classification certainty.

The classification certainty is a value calculated when the model classifies the data. The classification certainty indicates the sureness of the inferred classification. The likelihood of the classification of the data inferred by the model matching the actual classification increases as the classification certainty increases.

Hereinafter, "anomalous" data refers to the data for which the correct classification could not be inferred by the model, or the data for which the correct classification can be inferred but the classification certainty is low. The data for which the correct classification can be inferred by the model with a high classification certainty is called "normal" data.

It is desirable to update (retrain) the model if anomalous data occurs when the model classifies the data. However, the anomaly often is caused by the training data used to train the model or the internal structure of the model. Therefore, it is not easy for the user to discriminate the cause of the anomaly.

The model update support system 110 is used to provide the user with information relating to the cause of the anomaly and to support the update of the model. The user can understand how to best update the model based on the information provided by the model update support system 110.

The model update support system 110 according to the embodiment includes a processor 10. As illustrated in FIG. 1, the model update support system 110 may further include an acquirer 20, an outputter 30, model memory 51, and training data memory 52.

The acquirer 20 acquires information such as images, voice, etc., as digital data and outputs the digital data to the processor 10. The acquirer 20 includes, for example, at least one of an imaging device or a microphone. The acquirer 20 may store the acquired information in a not-illustrated memory. In such a case, the processor 10 refers to the acquired data by accessing the memory.

The processor 10 includes, for example, a CPU (Central Processing Unit), an electronic circuit, etc. The processor 10 includes a receiver 11, a classification certainty calculator 12, a determiner 13, a similarity calculator 14, and a cause selector 15.

For example, the acquirer 20 acquires first data by imaging or voice recording. The receiver 11 receives the first data output from the acquirer 20. When the receiver 11 receives the first data, the classification certainty calculator 12 accesses the model memory 51 and the training data memory 52.

The model memory 51 stores a trained first model. The training data memory 52 stores a training data group used to train the first model. The training data group includes multiple training data. Each of the training data includes one labeled datum and one label indicating the classification of the labeled datum.

The model memory 51 and the training data memory 52 include storage media such as hard disk drives, flash memory, network hard disks, etc. One storage medium may function as the model memory 51 and the training data memory 52.

The classification certainty calculator 12 inputs the first data to the first model and causes the first model to infer the classification of the first data. The classification certainty calculator 12 calculates a first classification certainty based on the output of the inference by the first model. The first classification certainty indicates the sureness of the classification (a first classification) of the first data inferred from the first model.

Further, the classification certainty calculator 12 calculates multiple classification certainties by sequentially inputting multiple labeled data to the first model. The classification certainty calculator 12 outputs the first data, the first classification certainty, and the multiple classification certainties based on the multiple labeled data to the determiner 13.

The determiner 13 determines whether or not the first classification certainty is sufficiently high based on the first classification certainty and the multiple classification certainties. For example, the determiner 13 calculates the average value and the fluctuation of the multiple classification certainties and sets a threshold using the average value and the fluctuation. The determiner 13 compares the first classification certainty to the threshold that is set. In the case where the first classification certainty is not less than the threshold, the determiner 13 determines that the first data is normal. This means that the likelihood is high that the first classification certainty is sufficiently high and the classification of the first data is inferred correctly.

The method for setting the threshold is not limited to the example. A value that is preset by the user may be used as the threshold without using the multiple classification certainties to set the threshold. In such a case, it is unnecessary to perform the calculation of the multiple classification certainties by the classification certainty calculator 12, the calculation of the average value and the fluctuation by the determiner 13, etc.

The first classification certainty being less than the threshold means that the first data is anomalous. In such a case, the determiner 13 outputs the first data to the similarity calculator 14 and outputs, to the cause selector 15, the multiple classification certainties relating to the multiple labeled data.

The similarity calculator 14 calculates multiple similarities by using the first data and the multiple labeled data. The multiple similarities respectively indicate the likenesses between the first data and the multiple labeled data. The similarity calculator 14 outputs the calculated multiple similarities to the cause selector 15.

The cause selector 15 is configured to select first information or second information based on the multiple similarities. A case is described in the example where the cause selector 15 appropriately selects the first information or the second information based on at least a part of the multiple classification certainties and the multiple similarities. The first information indicates that the training of the model is insufficient. The second information indicates that one of the labels included in the training data group is inappropriate.

In the case where the cause selector 15 selects the first information or the second information, the cause selector 15 outputs the selected information to the outputter 30. There are also cases where the cause selector 15 does not select the first information or the second information based on the multiple classification certainties and the multiple similarities.

The outputter 30 outputs the first information or the second information so that the user can recognize the first information or the second information. The outputter 30 includes at least one of a monitor, a speaker, or a printer. For example, the outputter 30 includes a monitor or a printer and outputs the first information or the second information to be viewable. The outputter 30 may output other information with the first information or the second information. The other information may be the first data, the first classification, the first classification certainty, first labeled data similar to the first data, the classification of the first labeled data, the classification certainty of the first labeled data, a label determined to be inappropriate, second labeled data labeled with the label determined to be inappropriate, etc.

According to the model update support system 110 according to the first embodiment, in the case where the first data is anomalous, information that indicates the cause of the anomaly can be provided to the user. The user can update the first model based on the provided information. For example, when the training of the first model relating to the first classification is insufficient, the first model is retrained for the first classification. When the label is mistaken, the first model is retrained using training data having the corrected label. Thereafter, the data can be classified with higher accuracy using the first model.

An example of the processing relating to the model update support system 110 will now be described more specifically.

For example, the first model is generated by the following method. First, deep learning is applied to the untrained model for a task such as classifying input data into each type. Then, pre-training is performed by inputting labeled data that is not labeled. Subsequently, fine tuning is performed for each type of the data by using taught labeled data. The data that is to be classified is input to the learning model that is generated; and classifying (labeling) by deep learning is performed.

The classification certainty calculator 12 inputs the first data to the trained first model and acquires an output vector from the first model. The classification certainty calculator 12 inputs the output vector into a softmax function and infers, as the classification of the first data, the classification in the output vector of the softmax function for which the maximum value is obtained. Also, the maximum value is used as the classification certainty.

The determiner 13 acquires the multiple classification certainties calculated by the classification certainty calculator 12 by sequentially inputting the multiple labeled data included in the training data group to the first model. The determiner 13 determines whether the first data is normal or anomalous by comparing the first classification certainty (x) of the first data to the average ($\mu$) and the variance ($\sigma$) of the classification certainties of the multiple labeled data. For example, the determiner 13 determines that the first data is anomalous when the following Formula 1 holds. $\alpha$ is a preset coefficient.

$$x-(\mu-\alpha*\sigma)<0.0 \qquad \text{[Formula 1]}$$

The similarity calculator 14 calculates multiple similarities respectively between the first data and the multiple labeled data. For example, the similarity calculator 14 calculates the similarity based on a Euclidean distance d represented by the following Formula 2. For example, the first data and the labeled data are more similar as the value of the similarity between these data increases. Other than the Euclidean distance, cosine similarity or the like may be used to calculate the similarity.

$$d = \sqrt{\sum_{i=1}^{n}(q_i - p_i)^2}$$ [Formula 2]

In Formula 2, p=(p1, p2, ..., pi) is the output vector of the layer one-previous to the final layer when inferring the first data. q=(q1, q2, ..., qi) is the output vector of the layer one-previous to the final layer when inferring the labeled data using the first model. Or, the output vector of the layer at least two-previous to the final layer may be used as the output vector for the first data and for the labeled data; or the output vector of the final layer may be used.

The cause selector 15 is configured to select the first information or the second information.

For example, the first information includes first detailed information and second detailed information recited below. The first detailed information indicates that training data relating to the first classification of the first data was not available when training the first model. The second detailed information indicates that the training data relating to the first classification was available when training the first model, but the training relating to the first classification was insufficient.

The cause selector 15 selects the first detailed information in the case where the first condition is satisfied. The first condition is when the maximum value of the multiple similarities falls below a first threshold. The maximum similarity between the first data and one example datum indicates that among the training data, the one example datum is most similar to the first data. The maximum value of the similarities being less than the first threshold indicates that the labeled data of the training data group that is most similar to the first data does not resemble the first data. This indicates that the training data when training the first model did not include data resembling the first data (data belonging to the first classification).

When the first condition is not satisfied, the cause selector 15 extracts multiple similar data from the multiple labeled data. The multiple similar data includes the first labeled data for which the maximum value of the multiple similarities is obtained. The multiple similar data is data among the multiple labeled data that is relatively similar to the first data. The cause selector 15 refers to multiple reference certainties respectively indicating the surenesses of the classifications of the multiple similar data. The multiple reference certainties are a part of the multiple classification certainties calculated by the classification certainty calculator 12.

The cause selector 15 calculates the average value and the fluctuation of the multiple reference certainties. In the case where a second condition is satisfied, the cause selector 15 selects the second detailed information. The second condition is when the average value is less than a second threshold or when the fluctuation is a third threshold or more. The second condition may be when the average value is less than the second threshold and the fluctuation is the third threshold or more.

The maximum value of the similarities being the first threshold or more indicates that data similar to the first data is included in the training data group. On the other hand, the average value of the multiple reference certainties being less than the second threshold or the fluctuation being the third threshold or more indicates that the first model is not trained sufficiently for the first data. In other words, this indicates that labeled data similar to the first data (labeled data belonging to the first classification) was insufficiently included in the training data group when training the first model.

In the case where neither the first condition nor the second condition is satisfied, the cause selector 15 determines that an inappropriate label included in the training data group is the cause of the anomaly; and the cause selector 15 selects the second information.

Or, in the case where neither the first condition nor the second condition is satisfied, the cause selector 15 refers to the multiple classifications of the multiple similar data inferred from the first model. For each of the multiple similar data, the cause selector 15 compares the multiple classifications with the multiple labels respectively labeling the multiple similar data. The cause selector 15 selects the second information when one of the multiple labels and one of the multiple classifications do not match for one similar data. When the multiple classifications and the multiple labels respectively match, the cause selector 15 does not select any information; and the processing ends.

Figure 2:
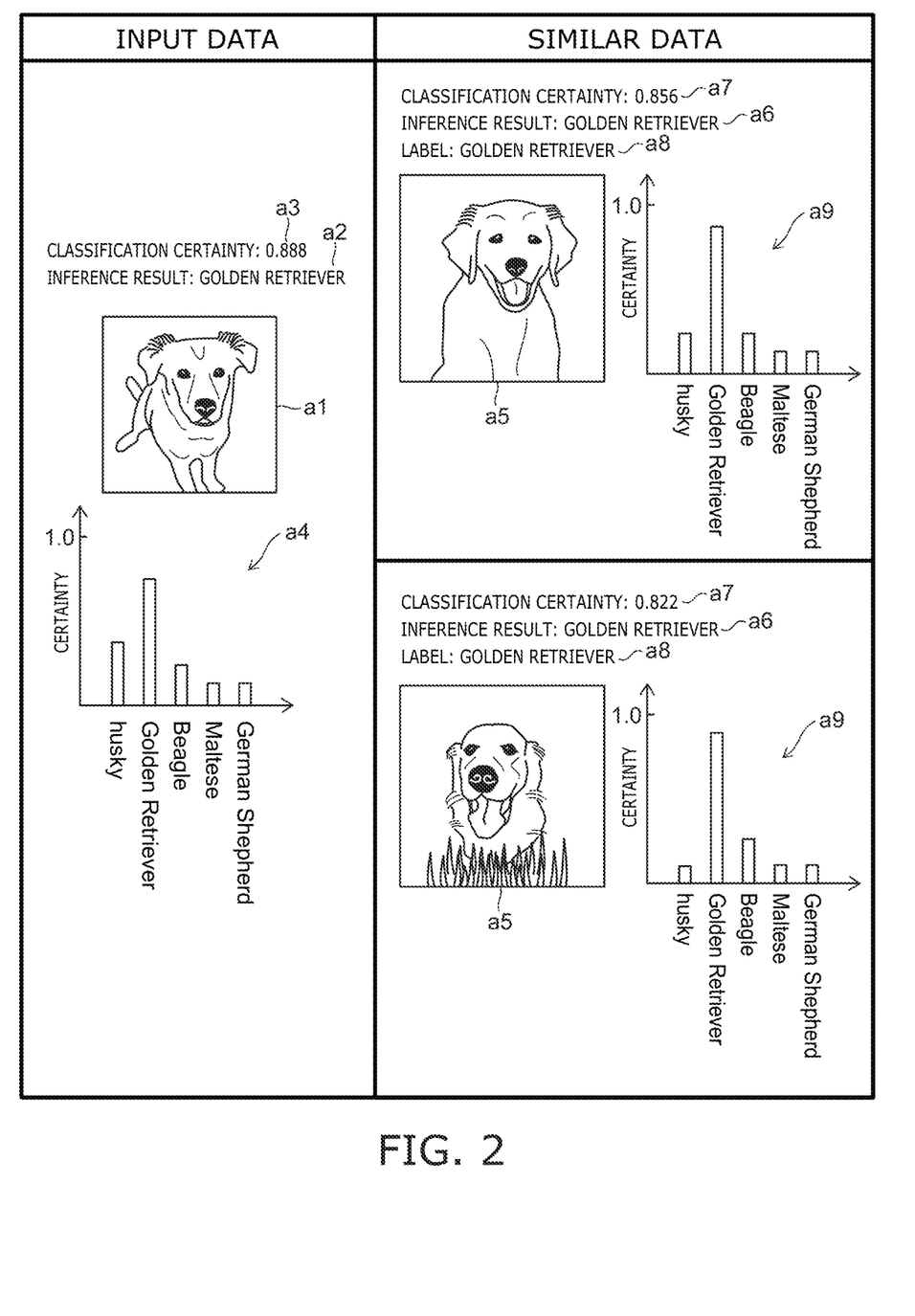
FIG. 2 is a schematic view illustrating an output according to the model update support system according to the first embodiment.

FIG. 2 is a schematic view illustrating an output according to the model update support system according to the first embodiment.

Figure 3:
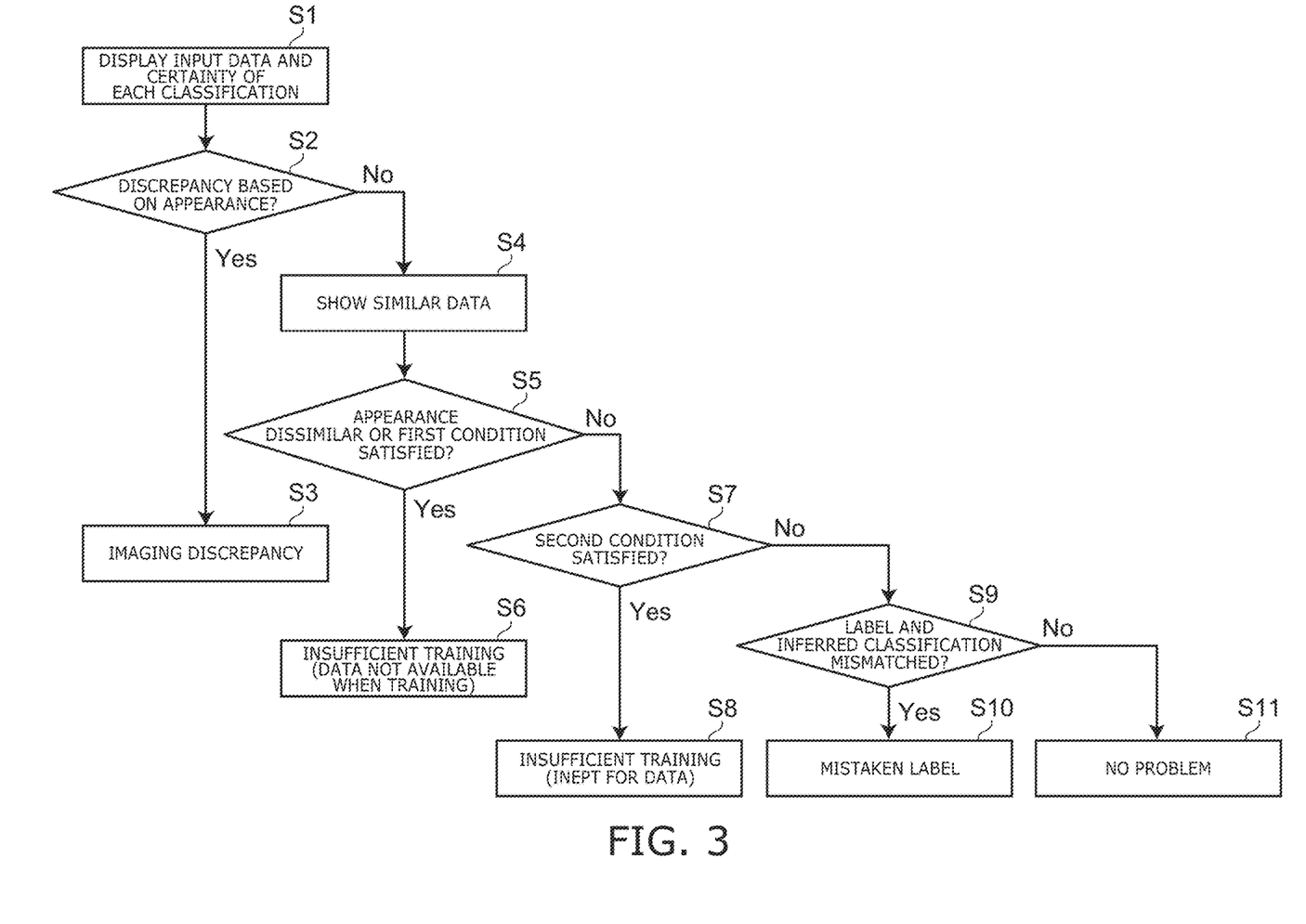
FIG. 3 is a flowchart illustrating processing using the model update support system according to the first embodiment.

FIG. 3 is a flowchart illustrating processing using the model update support system according to the first embodiment.

Figure 4:
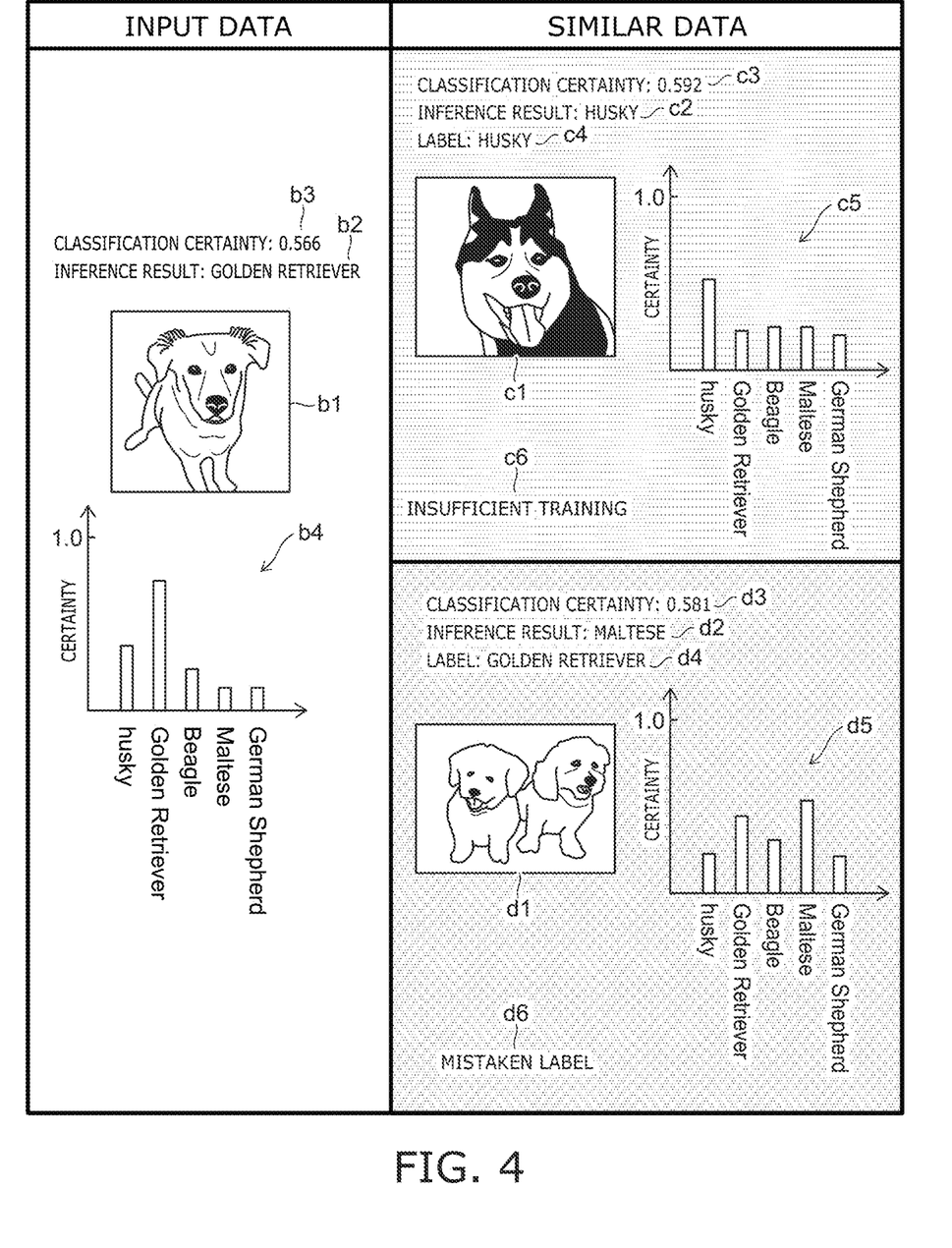
FIG. 4 and FIG. 5 are schematic views illustrating output according to the model update support system according to the first embodiment.
Figure 5:
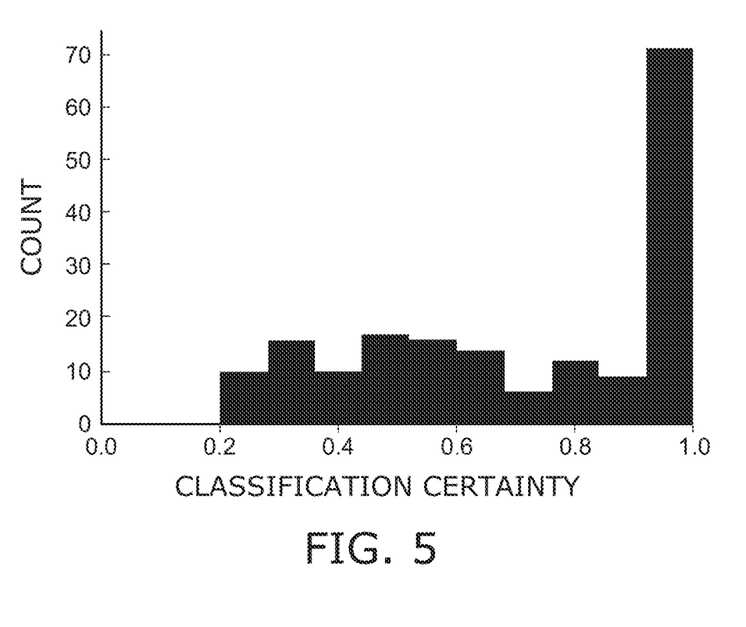

FIG. 4 and FIG. 5 are schematic views illustrating output according to the model update support system according to the first embodiment.

Here, an example is described in which images of dogs are input to the first model; and the first model is caused to infer the dog breed. In the example, the outputter 30 is a monitor.

For example, in the case where the first data is determined by the determiner 13 to be normal, the processor 10 causes the outputter 30 to display the first classification certainty and the first classification of the first data inferred from the first model.

FIG. 2 shows an output example when the first data is normal. In the example illustrated in FIG. 2, the processor 10 displays first data a1, a first classification a2, a first classification certainty a3, certainties a4 of the classifications relating to the first data, one or more labeled data a5 similar to the first data, classifications a6 of the labeled data inferred from the first model, classification certainties a7, labels a8 labeling the labeled data, certainties a9 of the classifications relating to the labeled data, etc.

When the input data is determined by the determiner 13 to be anomalous, the multiple similarities between the data and the multiple labeled data are input to the cause selector 15; and the processing of the flowchart illustrated in FIG. 3 is started. The cause selector 15 causes the outputter 30 to display the first data determined to be anomalous and the classification certainties of the classifications relating to the first data (step S1).

The user confirms the first data displayed by the outputter 30 and determines whether or not a discrepancy is in the data based on the appearance (step S2). An example of a discrepancy of the appearance is when the entire screen is blurred and the image itself cannot be recognized, etc. When there is a discrepancy based on the appearance, the cause of the anomalous data determination is determined to be an imaging discrepancy (step S3).

In the case where there is no discrepancy based on the appearance, the cause selector 15 causes the outputter 30 to display labeled data having a relatively high similarity with the first data (step S4). The user determines whether or not the displayed labeled data resembles the first data (step S5).

In the case where the displayed labeled data does not resemble the first data, the cause selector 15 determines that the cause of the anomaly is insufficient training of the first model (step S6); and the cause selector 15 selects the first detailed information. In other words, it is determined that training of the first model relating to the first data was not performed.

Instead of the user determining whether or not the labeled data resembles the first data, the cause selector 15 may perform the determination using the similarity. For example, as described above, the cause selector 15 determines whether or not the first condition is satisfied. In the case where the first condition is satisfied, the cause selector 15 selects the first detailed information.

In the case where the displayed labeled data resembles the first data (the first condition is not satisfied), the cause selector 15 determines whether or not the second condition is satisfied as described above (step S7). In the case where the second condition is satisfied, the cause selector 15 determines that the cause of the anomaly is insufficient training of the first model (step S8); and the cause selector 15 selects the second detailed information. More specifically, it is determined that the training of the first model relating to the first data was performed; but the training was insufficient.

In the case where the second condition is not satisfied, the cause selector 15 determines, for each of the multiple similar data, whether or not the labels labeling the multiple similar data match the classifications of the multiple similar data inferred from the first model (step S9). In the case where the label does not match, the cause selector 15 determines that the cause of the anomaly is a mistaken label (step S10); and the cause selector 15 selects the second information. In the case where the label matches, the cause selector 15 determines that the anomaly is not a problem (step S11); and the processing ends.

In the case where the cause selector 15 selects at least some information in the processing recited above, the cause selector 15 causes the outputter 30 to display the information. FIG. 4 illustrates the case where the cause selector 15 causes the outputter 30 to display the first information and the second information.

In the example of FIG. 4, first data b1, a first classification b2, a first classification certainty b3, and certainties b4 of the classifications relating to the first data are displayed for the first data. As the first information, labeled data c1 that is similar to the first data, a classification c2 of the labeled data c1 inferred from the first model, a classification certainty c3 that indicates the sureness of the classification c2, a label c4 that labels the labeled data c1, certainties c5 of the classifications relating to the labeled data c1, first information c6, etc., are displayed. As the second information, labeled data d1 for which a mismatch is discovered between the label and the classification, a classification d2 of the labeled data d1 inferred from the first model, a classification certainty d3 that indicates the sureness of the classification d2, a label d4 that labels the labeled data d1, certainties d5 of the classifications relating to the labeled data d1, second information d6, etc., are displayed.

The region where the labeled data relating to the first information or the second information is displayed may be set to be discriminable from the region where the other data is displayed. In the example illustrated in FIG. 4, patterns that are discriminable from those of the other data are displayed in the regions where the labeled data c1 and the labeled data d1 are displayed. Mutually-different colors, etc., may be provided instead of the patterns.

The processor 10 also may cause the outputter 30 to output other information. For example, the processor 10 may cause the outputter 30 to display a saliency map showing which part of the data is being responded to when inferring. The processor 10 may separately display R, G, and B of the image of the first data. Also, the image of the first data and the saliency map may be displayed superimposed.

Here, a case is described where one datum is input to the processor 10. Multiple data (e.g., multiple images) may be input to the processor 10. In such a case, a histogram of the classifications such as that illustrated in FIG. 5 may be presented for the initial input of the multiple data. Thereby, the user can determine that there is no bias by classification. If a bias exists, the likelihood of the screening being performed prejudicially, etc., can be detected.

As described above, according to the model update support system including the processor 10 including the cause selector 15, the first information that indicates insufficient training of the first model or the second information that indicates an inappropriateness of one of the multiple labels can be output based on the classification certainty indicating the sureness of the classification of the first data calculated using the first model and based on the multiple similarities respectively indicating the likenesses between the first data and the multiple labeled data. By providing the anomaly cause information to the user, the update of the first model is easy.

In the example illustrated in FIG. 1, other than the cause selector 15, the processor 10 includes the receiver 11, the classification certainty calculator 12, the determiner 13, and the similarity calculator 14. This is not limited to the example; and the processor 10 may not include components other than the cause selector 15. For example, the similarities and/or the classification certainties may be calculated by another processor; and the calculation results may be input to the processor 10.

Figure 6:
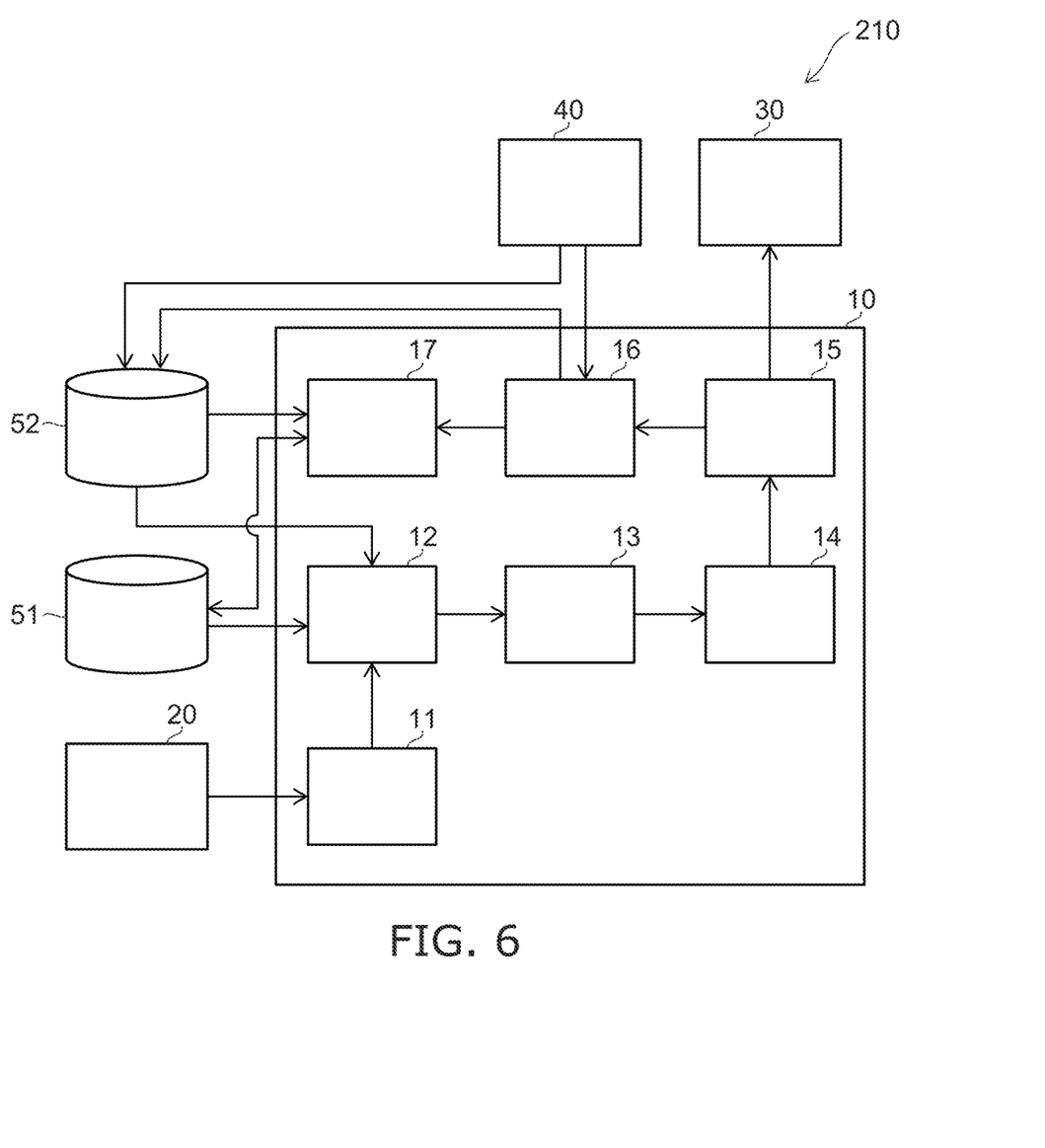
FIG. 6 is a schematic view illustrating the configuration of a model update support system according to a second embodiment.

FIG. 6 is a schematic view illustrating the configuration of a model update support system according to a second embodiment.

In the model update support system 210 according to the second embodiment illustrated in FIG. 6, the processor 10 further includes a labeler 16 and an updater 17. The model update support system 210 further includes an inputter 40.

The processing of the receiver 11, the classification certainty calculator 12, the determiner 13, the similarity calculator 14, and the cause selector 15 of the processor 10 is similar to that of the model update support system 110. For example, the first information or the second information is selected by the cause selector 15; and the information is output from the outputter 30. The user operates the inputter 40 by referring to the first information or the second information that is output.

The inputter 40 includes at least one of a keyboard, a mouse, a touch panel, or a microphone (a voice operation).

For example, when the first information is output, the user performs an operation to add, to the training data memory 52, training data relating to the original classification of the first data determined to be anomalous. When the second information is output, the user performs an operation of inputting the correct label. When the user inputs the label, the labeler 16 labels the labeled data related to the second information with the label input from the user. The labeler 16 stores the labeled data and the label in the training data memory 52.

When the training data group of the training data memory 52 is modified, the updater 17 updates (retrains) the first model of the model memory 51 by using the modified training data group. The modification of the training data group includes the addition of training data, the correction of a label, etc. The updater 17 stores the updated first model in the model memory 51.

By including the labeler 16 and the updater 17, the processor 10 not only can provide the anomaly cause information to the user but also can perform the update of the first model to improve the anomaly. Thereby, the convenience of the user can be improved.

An example is illustrated in FIG. 6 in which one processor functions as the receiver 11, the classification certainty calculator 12, the determiner 13, the similarity calculator 14, the cause selector 15, the labeler 16, and the updater 17. This is not limited to the example; and these functions may be realized by multiple processors. For example, one processor may function as the receiver 11, the classification certainty calculator 12, the determiner 13, the similarity calculator 14, and the cause selector 15; and another processor may function as the labeler 16 and the updater 17. A system that includes such processors can be considered to substantially include the processor 10.

According to the embodiments described above, a model update support system can be provided in which information indicating the cause of an anomaly can be output.

For example, the processing of the various data recited above is executed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions described in the program based on the program. In the computer, the acquisition (or the reading) of the program may be performed via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium according to the embodiments stores a program that can cause a computer to execute the processing of the various information recited above. The recording medium according to the embodiments also includes a recording medium to which a program is downloaded and stored using a LAN, the Internet, etc. The processing recited above may be performed based on multiple recording media.

The computer according to the embodiments includes one or multiple devices (e.g., personal computers, etc.). The computer according to the embodiments may include multiple devices connected by a network.

Hereinabove, embodiments of the invention are described with reference to specific examples. However, the invention is not limited to these specific examples. For example, one skilled in the art may similarly practice the invention by appropriately selecting specific configurations of components such as the processor, the acquirer, the outputter, the inputter, the memory, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all model update support systems practicable by an appropriate design modification by one skilled in the art based on the model update support systems described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A model update support system supporting an update of a first model trained using a training data group, the training data group including a plurality of labeled data and including a plurality of labels respectively labeling the plurality of labeled data, the system comprising:
a processor configured to
sequentially input first data and the plurality of labeled data to the first model,
acquire a first classification certainty and a plurality of classification certainties by using output from the first model, the first classification certainty indicating sureness of classification of the first data, the plurality of classification certainties respectively indicating surenesses of classifications of the labeled data,
determine that the first data is normal in a case where the first classification certainty is not less than a threshold, and determine that the first data is anomalous in a case where the first classification certainty is less than the threshold, the threshold being set by using the plurality of classification certainties, and
in a case where the first data is determined to be anomalous, output first information or second information based on the first classification certainty and a plurality of similarities, the plurality of similarities respectively indicating likenesses between the first data and the plurality of labeled data, the first information indicating that the training of the first model is insufficient, the second information indicating that one of the plurality of labels is inappropriate.

2. The system according to claim 1, wherein when outputting the first information, the processor outputs the first information, the first data, first labeled data included in the plurality of labeled data, and a first similarity indicating a likeness between the first data and the first labeled data.

3. The system according to claim 2, wherein the first information includes:
first detailed information indicating that training of the first model relating to the first data has not been performed; and
second detailed information indicating that the training of the first model relating to the first data is insufficient, and
the processor is configured to output one of the first detailed information or the second detailed information as the first information.

4. The system according to claim 2, wherein
in the case where the first data is determined to be anomalous, the processor refers to a plurality of reference certainties for a plurality of similar data, the plurality of similar data including first similar data and being extracted from the plurality of labeled data, a maximum value of the plurality of similarities being obtained for the first similar data, the plurality of reference certainties being calculated using the first model and respectively indicating surenesses of classifications of the plurality of similar data, and
the processor outputs the first information when at least one of a first condition or a second condition is satisfied, the first condition being when the maximum value of the plurality of similarities is less than a first threshold, the second condition being when an average value of the plurality of reference certainties is less than a second threshold or when a fluctuation of the plurality of reference certainties is a third threshold or more.

5. The system according to claim 1, wherein
when outputting the second information, the processor outputs the second information, one of the plurality of labels, second labeled data labeled with the one of the plurality of labels, and a second classification of the second labeled data inferred from the first model, and
the second classification is different from the one of the plurality of labels.

6. The system according to claim 5, wherein
the processor refers to a plurality of similar data and a plurality of classifications of the plurality of similar data, the plurality of similar data including first similar data and being extracted from the plurality of labeled data, a maximum value of the plurality of similarities being obtained for the first similar data, the plurality of classifications being inferred from the first model,
the processor compares, for each of the plurality of similar data, the plurality of classifications and a part of the plurality of labels respectively labeling the plurality of similar data, and
when one of the plurality of labels does not match one of the plurality of classifications, the processor outputs the one of the plurality of labels as the second labeled data and outputs the one of the plurality of classifications as the second classification.

7. The system according to claim 1, further comprising:
an outputter configured to output the first information or the second information; and
an inputter configured to input an operation relating to the first information or the second information,
when receiving the operation, the processor updates the first model based on the operation.

8. A model update support system comprising a processor,
the processor receiving input of a first data,
the processor referring to a first model trained using a training data group, the training data group including a plurality of labeled data and including a plurality of labels respectively labeling the plurality of labeled data,
the processor sequentially inputting the first data and the plurality of labeled data to the first model to acquire a first classification certainty and a plurality of classification certainties, the first classification certainty indicating sureness of classification of the first data, the plurality of classification certainties respectively indicating surenesses of classifications of the labeled data, the first classification certainty and the plurality of classification certainties being calculated
the processor calculating a plurality of similarities respectively indicating likenesses between the first data and the plurality of labeled data,
the processor determining that the first data is normal in a case where the first classification certainty is not less than a threshold set using the plurality of classification certainties, and determining that the first data is anomalous in a case where the first classification certainty is less than the threshold, and
the processor being configured to output, based on the plurality of similarities, information relating to the first model in a case where the first data is determined to be anomalous.

9. The system according to claim 8, further comprising:
an outputter configured to output information relating to the first model; and
an inputter configured to input an operation relating to the information,
when receiving the operation, the processor updates the first model based on the operation.

10. The system according to claim 8, wherein
the processor is configured to further output the first data, the first classification certainty, and the first labeled data in the case where the first data is determined to be anomalous.

11. The system according to claim 10, wherein
the processor extracts a plurality of similar data including a first labeled data from the plurality of labeled data based on the plurality of similarities,
the first labeled data is data for which a maximum similarity is obtained among the plurality of labeled data,
the plurality of similar data includes a second labeled data different from the first labeled data, and
the processor is configured to further output the second labeled data and a label of the second labeled data in a case where a classification of the second labeled data by the first model is different from the label of the second labeled data.

* * * * *